UNITED STATES PATENT OFFICE.

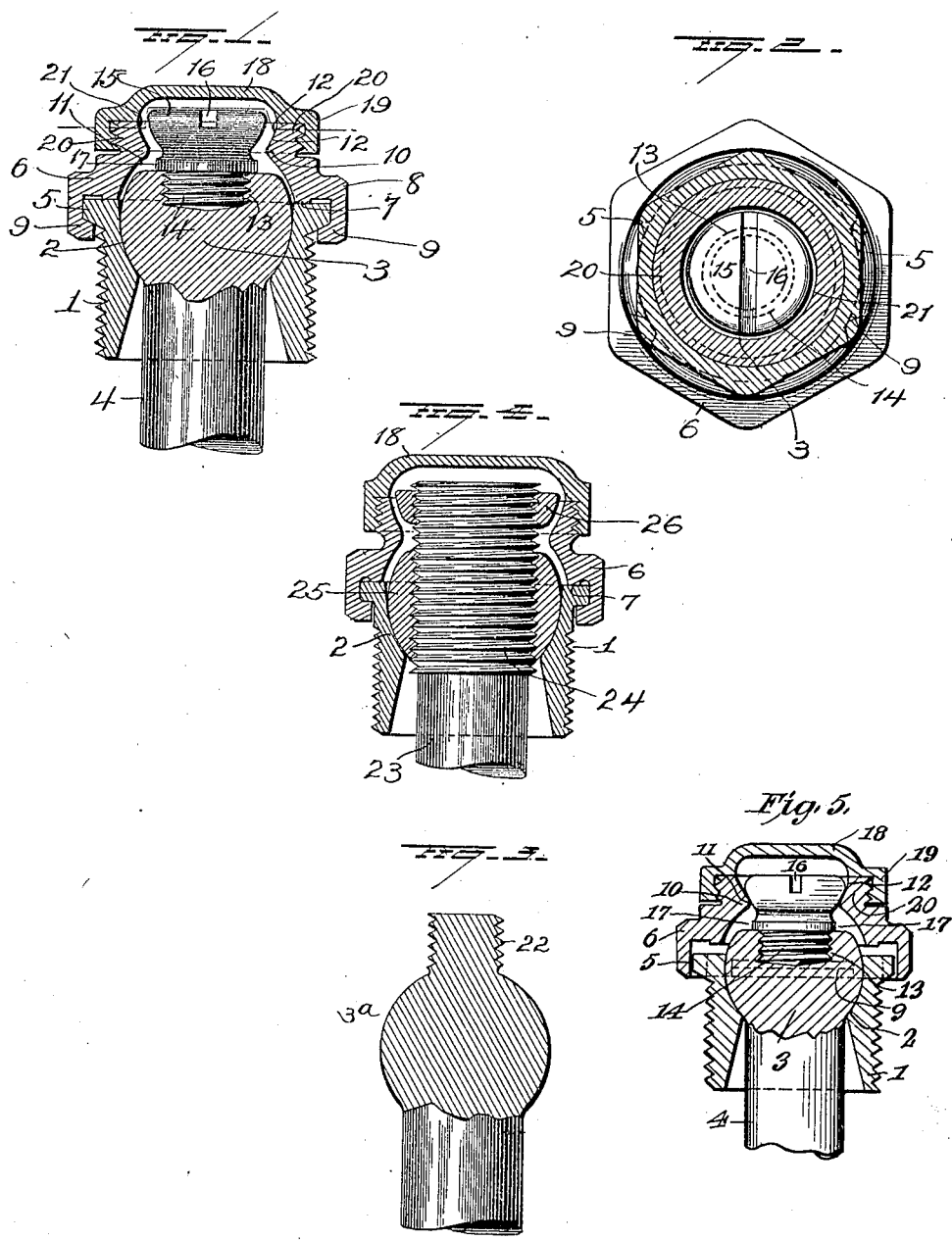

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,298,309.  Specification of Letters Patent.  Patented Mar. 25, 1919.

Application filed May 3, 1918. Serial No. 232,318.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to the bearing and closure devices for the head of the bolt,—the object of the invention being to so construct such devices as to facilitate the quick testing of the bolt.

With this and other objects in view, the invention consists in certain novel features of construction and combinations of parts as hereinafter set forth and pointed out in the claims.

In the accompanying drawings, Figure 1 is a longitudinal sectional view of my improved staybolt structure. Fig. 2 is a transverse sectional view, Figs. 3 and 4 are views of modifications, and Fig. 5 is a view showing the position the cap will assume when the bolt is being tested.

1 represents a sleeve or bushing adapted for connection with a boiler sheet and provided interiorly with a curved face 2 which serves as a bearing for the rounded head 3 of a staybolt 4. The sleeve or bushing 1 is provided at its outer end with segmental shoulders 5 having rear beveled or cam faces.

A cap 6 is disposed over the head of the bolt and provided interiorly with a bearing face 7 to seat against the end of the bushing 1 and said cap is also provided with a peripheral flange 8 to encircle the shouldered end of the sleeve or bushing,—said flange being provided at its free end with internal segmental shoulders 9 having cam faces to coöperate with the cam faces of the shoulders 5 so that when said cap shall have been applied to the bushing and turned, its bearing face 7 will be pressed tightly against the seat at the end of the sleeve 1. The cap 6 is provided interiorly with an annular flange or enlargement 10 which is so formed as to provide a clearance space 11 for the head of the bolt and to form a seat 12 for a purpose which will be explained.

The head 3 of the staybolt is made with a socket 13 having a threaded wall to receive the shank 14 of a knob or head 15, the latter being provided with a slot 16 to receive a tool, and said knob or head is made with an annular flange 17 to seat against the head 3 of the bolt. The knob or head 15 is normally inclosed by a supplemental cap or cover 18 having an internally threaded annular flange 19 to screw on a threaded shank portion 20 projecting from the cap 6 and also having a seat 21 to rest against the end of the shank portion 20 of the cap.

In order to test the staybolt, the operator will turn the cap 6 with the use of a suitable wrench until the segmental shoulders 9 shall have been moved out of line with the segmental shoulders 5. He will then attempt, with the use of a suitable tool to pry the cap from the sleeve or bushing 1. This will cause the seat 12 afforded by the annular flange or enlargement 10 to engage the knob 15 on the head of the bolt and tend to pull the bolt lengthwise. Should there be no movement of the bolt after the flange or enlargement engages the knob, this will indicate that the bolt is whole. If the bolt has been broken, the cap 6 could be removed carrying a portion of the broken bolt with it. If the bolt is found to be whole, the operator needs only to turn the cap to its locked position.

In the form of the invention shown in Fig. 3 a staybolt is shown having a spherical head 3ª having a threaded shank 22 to receive a suitable knob to perform the same functions as the knob 15 shown in Fig. 1.

In the form of the invention shown in Fig. 4, a staybolt 23 is shown having a threaded portion 24 and on the latter, a head 25 is screwed,—said head being in the form of an annulus having a curved exterior face. In this form of the invention, a collar 26 is screwed on the threaded portion of the bolt above and spaced from the annular head 25 and performs the same functions as the knob 15 in the construction shown in Fig. 1.

Having fully described my invention what I claim as new and desire to secure by Letters Patent, is:

1. In a staybolt structure, the combination with a bearing member adapted for connection with a boiler sheet, of a cap having interlocking relation to said bearing member and provided interiorly with an annular flange or enlargement, a staybolt having a head mounted in said bearing member, and a part on said head to be engaged by the internal annular flange or enlargement of the cap.

2. In a staybolt structure, the combination with a bearing member and a staybolt having a head mounted in said bearing member, of a cap having interlocking relation with said bearing member and provided with an internal annular flange or enlargement, and a member secured to and projecting from the head of the staybolt so as to be in position to be engaged by the internal annular flange or enlargement of the cap when the latter is moved in a direction away from the bearing member.

3. In a staybolt structure, the combination with a bearing member and a staybolt having a head mounted therein, said head having a threaded portion, of a cap having interlocking relation with the bearing member and provided interiorly with an annular flange or enlargement disposed beyond the head of the staybolt, and a knob secured to the threaded portion of the head of the staybolt, said knob overhanging the internal annular flange or enlargement of the cap and normally spaced therefrom.

4. In a staybolt structure, the combination with a bearing member and a staybolt having a head mounted in said bearing member, of a cap having interlocking relation with said bearing member and provided with an internal annular flange or enlargement and with an open shank portion, a knob secured to the headed end of the bolt and overhanging said internal annular flange or enlargement of the cap, and a supplemental cap or cover screwed on said shank portion of the cap and inclosing the knob on the staybolt.

In testimony whereof I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."